United States Patent
Hellman et al.

(10) Patent No.: US 6,909,940 B2
(45) Date of Patent: Jun. 21, 2005

(54) METHOD AND APPARATUS FOR THE EXCHANGE OF BATTERIES IN A ROBOT LOCATED IN AN AUTOMATED LIBRARY

(75) Inventors: Diana J. Hellman, Tucson, AZ (US); Michael P. McIntosh, Tucson, AZ (US); Daniel S. Moore, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 10/459,247

(22) Filed: Jun. 11, 2003

(65) Prior Publication Data

US 2004/0254678 A1 Dec. 16, 2004

(51) Int. Cl.[7] .............................................. G06F 19/00
(52) U.S. Cl. ...................... 700/245; 700/213; 700/214; 700/215; 700/247; 294/85.4; 294/115; 294/116; 901/4; 901/38; 901/39
(58) Field of Search .................. 700/245, 213–215, 700/247; 294/115–116, 86.4; 901/4, 38, 39; 414/277, 281, 800; 360/92; 711/111; 714/6

(56) References Cited

U.S. PATENT DOCUMENTS

| 4,698,775 | A | | 10/1987 | Koch et al. |
|---|---|---|---|---|
| 4,736,826 | A | | 4/1988 | White et al. |
| 5,413,454 | A | | 5/1995 | Movsesian |
| 6,287,140 | B1 | * | 9/2001 | Itoh ............................ 439/500 |
| 6,304,798 | B1 | | 10/2001 | Carpenter |
| 6,327,519 | B1 | * | 12/2001 | Ostwald et al. ............. 700/245 |

OTHER PUBLICATIONS

Yaw et al., SMURF, 2000, Internet, pp. 1–18.*
Cao, Recharging, 1995, Internet, pp. 1.*
Cai et al., Advance traction rechargeable battery system for cableless mobile robot, 2003, IEEE, pp. 234–239.*
Silverman et al., Staying alive: A docking station for autonomous robot recharging, 2002, IEEE, pp. 1050–1055.*

* cited by examiner

*Primary Examiner*—Thomas G. Black
*Assistant Examiner*—McDieunel Marc
(74) *Attorney, Agent, or Firm*—Scully, Scott, Murphy & Presser; John C. Kennel

(57) ABSTRACT

An apparatus and a method for the exchange of power-supplied batteries which are arranged in a media-conveying untethered robot which is located in an automated data-storage library.

19 Claims, 1 Drawing Sheet

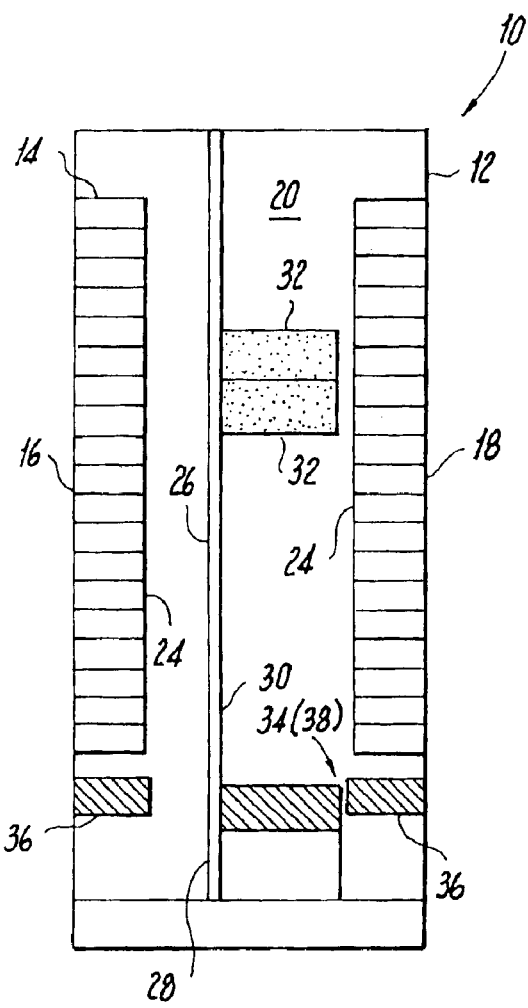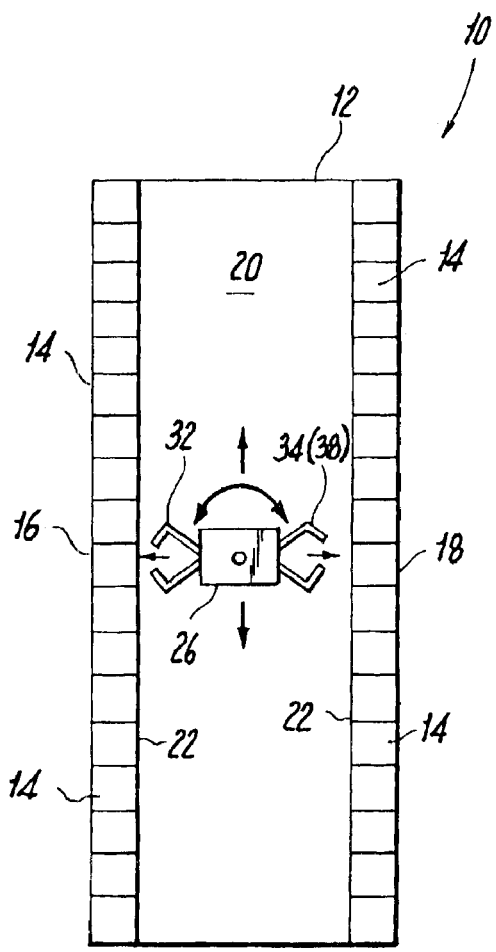
FIG. 1
FIG. 2

METHOD AND APPARATUS FOR THE EXCHANGE OF BATTERIES IN A ROBOT LOCATED IN AN AUTOMATED LIBRARY

BACKGROUND OF THE INVENTION

1. Field of the Invention

The present invention relates to an apparatus and to a method for the exchange of batteries which are arranged in a media conveying robot which is located in an automated data-storage library.

In the data-processing technology, automated data-storage libraries are frequently utilized for the storage of various data media which are employed in data-processing systems. Generally, such data-processing systems necessitate the provision of considerable amounts of data-storage capacity which, upon occasion, may be needed rapidly, and stored in memory and hard disk drives, and whereby the various data may not be necessarily provided in a rapid manner. Consequently, data which are not required to be employed in an immediate manner may constitute frequently accessed data whereby the storage thereof may be in removable data-storage media, such as magnetic tape cartridges, optical disk cartridges or the like, which may be stored in so-called cells provided in the automated data-storage libraries.

Ordinarily, such libraries provide an adequate amount of access to considerable quantities of the data-storage media, the latter of which are generally stored in storage shelves or cells and are accessed by one or more accessors and delivered by therewith associated grippers or pickers to data-storage drives in the automated data-storage libraries. Potentially, an automated data-storage library may store in excess of 6,000 cartridges, which although even if not frequently accessed, may be needed rapidly at certain times. Basically, the accessors for conveying and transferring the data-storage media, for example; such as storage automation devices in the form of as the 3584 Ultra Scalable Tape Library (a trademark of IBM), employ cartridge and handling assemblies which are frequently referred to as either grippers or pickers in the technology. These electromechanical devices, in effect will grab or engage a cartridge for transport from one location to another whereby some type of calibration sensor is frequently mounted on the cartridge gripper so as to be able to measure the relationship between the theoretical position and the actual position of the gripper. This, in essence, reduces the numerous physical tolerances encountered in the construction and functioning of the automatic data-storage library, and as a result reduces structural and operating expenditures, while concurrently improving upon the reliability in the handling and transporting of the cartridges.

Basically, the electro-mechanical devices which transport such tape or optical disk cartridges from one location to another within the automatic data-storage library are arranged on a robot which is adapted to travel the full length of the library, and wherein the robot receives both electrical power and information as to the location to which or from which it is to move and what it is to do in its physical applications, through the intermediary of a cable connection. Consequently, in order to ensure the ready and unobstructed movement of the robot along the entire length of the automated data-storage library, the utilized cable limits the design of the expandable library to a lengthy rectangle. Moreover, the cable also requires replacement when the library is extended with additional frames to reach new and greater lengths for the library, thereby resultingly incurring additional costs and operating expenditures for this purpose. A desirable aspect would be to be able to eliminate the cable or tethering of the robot by eliminating the cable arrangement and providing a wireless-operated robot which essentially must be supplied continuously with electrical operating power without any interruption in the functioning and motion of the robot through the extent of the library.

Although this kind of untethered operation of the robot may be implemented by means of equipping the robot with battery packs or various similar types of electrical accumulators, the battery pack or batteries require to be periodically recharged as it or they are drained without causing any interference in the continuous performance of the automatic data-storage library, afforded by the robot, which must always be ready for access by an external user for the inputting and/or retrieving of data which are stored in various cells housing the tape cartridges. Inasmuch as it is important that since the already presently stringent demands for automatic data-storage library performance and reliability are constantly increasing, it is of vital significance that the wireless electrical power source be continuously available to the robot without any interruption, as a result of which the robot does not have the opportunity to be seated on a charger for the batteries over any lengthy or appreciable periods of time.

2. Discussion of the Prior Art

Presently various types of robotic devices are available and/or employed in industry and in the technology which are adapted to provide or impart movement to different types of components in diverse types of applications and structures, including automated data-storage libraries.

Carpenter U.S. Pat. No. 6,304,798 B1 discloses an automated data-storage library with a wireless robotic positioning system, and in which a robot possesses grippers for engaging and retrieving information tape cartridges which are stored within various cells in the library confines. To that effect, the robot is adapted to receive wireless control signals which will convey and locate the robot including the gripper structures thereof at specified locations so as to either convey tape cartridges into cells of the automated data-storage library or to retrieve such tape cartridges from various cells for purposes defined by users as is well known in the technology. Generally, such a robot may be equipped with either batteries or various external cable-supplied electrical power in order to facilitate the operation thereof in a continuous manner, such electrical supply not being defined as being continuous in the specification of the patent.

Movsesian U.S. Pat. No. 5,413,454 discloses a mobile robotic arm which may be operated in conjunction with a wheelchair or the like, and wherein electrical power may be supplied thereto through the provision of a battery arranged within the framework of the robotic structure. Apparently, upon the battery being drained or low in power, an effort must be exerted to remove the drained battery and replace the latter with a fully charged battery or similar type of electrical power source, which entails a considerable amount of downtime or inactive periods during which the robotic arm cannot be gainfully employed. That type of intermittent suppliability of electrical power to the robotic construction cannot be accepted in current highly sophisticated automated data-storage libraries, in which it is always necessary to provide a constant source of power to a robot or similar structure engaged in transporting and retrieving information and data which may be provided on tape cartridges.

White et al. U.S. Pat. No. 4,736,826 discloses a remotely controlled and/or powered mobile robot which is tethered to a cable supplying electrical power and which may be moved to various locations within a confined area. Upon any potential power failure or outage, a standby battery-type construction may temporarily provide the robot with electrical power so as to continue functioning thereof. These sources of power may comprise a series, such as six rechargeable batteries which when drained or low must be replaced with fully charged batteries. This, again, entails considerable amount of inoperative or downtime while the batteries are being replaced by other fully charged batteries, thereby inhibiting any continuous operation of the mobile robot.

Koch et al. U.S. Pat. No. 4,698,775 discloses a self-contained mobile device which is reprogrammable so as to enable automated movement during the functioning thereof. As in the previous publications, this quite likely entails the use of chargeable batteries as a power source, which requires shutting down of the robotic structure during battery replacement with fully charged batteries.

SUMMARY OF THE INVENTION

Accordingly, in order to clearly and unambiguously distinguish over the art, pursuant to the present invention, there is provided a cableless robot arrangement for an automatic data-storage library which, in addition to the provision of gripper arrangements on the robot which enable the transporting and retrieving of various types of tape cartridges in the tape deck library among numerous cells universally in either x, y or z directions, the robot is equipped with a further gripper arrangement, preferably towards the bottom of the robot, which can manipulate a separate small array or library of rechargeable batteries. Thus, the grippers transporting or mounting the rechargeable batteries on a robot are adapted to position the old or drained battery or batteries into suitable charging cells provided in the automated data-storage library, while concurrently a further gripper structure on the robot engages and withdraws new or fully charged batteries into the robot from the library charging cells, thereby ensuring a constant and uninterrupted supply of electrical power to the robot facilitating the continuous operation thereof.

It is also possible to equip the data-storage library with a series of battery-charging cells which are spaced along the lower portion and length thereof so as to facilitate the exchange of batteries with the robot at different ends or locations along the entire extent of the library.

Such battery exchanges between the robot and the charging cells in the library can be readily implemented concurrently or simultaneously with the swapping of media contained in different tape cartridges, thereby not in any manner impacting or retarding the performance of the automated data-storage library.

Accordingly, it is an object of the present invention to provide a novel apparatus for the exchanging of rechargeable batteries in a robot in a manner which will not impact the continuous or uninterrupted functioning of the robot.

Another object of the present invention is to provide an apparatus for the exchange of rechargeable batteries in an automatic data-storage library wherein drained or spent batteries in a robot can be readily replaced by fully charged batteries located in various battery-charging cells in the automatic data-storage library while facilitating the continuous operation of the robot and the uninterrupted conveyance and swapping of media in the library.

A further object of the present invention is to provide a method of exchanging rechargeable power-supplying batteries in a robot employed in media-transferring operations in an automatic data-storage library.

BRIEF DESCRIPTION OF THE ACCOMPANYING DRAWINGS

Reference may now be made to the following detailed description of a preferred embodiment of the invention, taken in conjunction with the accompanying drawings; wherein:

FIG. 1 illustrates, generally diagrammatically, an automated data-storage library shown in an end view, with a robot incorporating a battery-exchanging structure pursuant to the invention; and FIG. 2 illustrates, generally diagrammatically, a top plan view of the automated data-storage library incorporating the robot with a battery exchanging structure pursuant to the invention.

DETAILED DESCRIPTION OF A PREFERRED EMBODIMENT

Referring now in further and specific detail to the drawings, in FIG. 1 there is illustrated generally diagrammatically an end sectional view of an automated data-storage library 10. The library 10 includes a housing structure 12 containing a multiplicity of data-storage cells or shelves 14, capable at times to store an excess of 6,000 tape cartridges (not shown) which although if even not frequently accessed, may be needed rapidly at certain times to provide information or the inputting of data by an external user.

Basically, the cells or shelves 14 in a lengthwise extending library 10 may be provided at opposite sides of walls 16, 18 facing each other, and wherein a space 20 extending between opposite rows 22 or arrays of vertical columns 24 of the media cells extending the length of the library may be traversed by a robot 26 traveling along a track 28 or other floor structure preferably within but not limited to the confines of the library. It is also possible that the robot 26 be permitted to roam freely rather than along the track or a defined path, and may be able to implement an essentially unrestricted free-form movement during its displacement or travel.

The robot 26 which rises over substantially the full height of the interior of the data-storage library 10, is adapted to be transported from one end to the other end along the length of the library. The robot 26 may also be rotatable about its own vertical axis 30 so as to facilitate the positioning of an array of media grippers 32 on the robot in particular orientation with selected media cells or shelves on opposite sides thereof. Thus, although the grippers are shown extending from one side of the robot 26 for either engaging or transporting or retrieving media represented by tape cartridges or the like from or into cells 14 on wall 18, the robot may be rotated about its vertical axis 30 so as to enable the media grippers 32 to engage media such as tape cartridges at the opposite wall 16 as desired during the operation of the library.

The media grippers 32 may be vertically displaceable along the robot 26 so as to be able to engage media or tape in cells 14 either from the lowermost end to the upper most end and the full length of the automated data-storage library 10, thereby continuously rendering such media tapes accessible to a user, which may be based upon an external preferably wireless command, as is well known in the automated data-storage technology.

In this instance, in order to avoid having to attach cables which are adapted to supply electrical power to the robot 26, the lower end portion of the latter may be equipped with suitable grippers 34 which are adapted to be manipulated into operative engagement with rechargeable batteries stored in battery-charging cells 36 at the lower portion cells of the opposite side walls 16, 18 of the library 10, and which may be spaced along the length of the library. Furthermore, it may also be possible to provide battery-charging stations in front of various drives to facilitate charging of the batteries during idling of the library.

In essence, the lower battery grippers 34 of the robot 26 may engage fully-charged batteries and draw them into the robot for supplying electrical power thereto, while concurrently batteries in the robot which are low in power or drained, responsive to suitable signals wirelessly or transmitted by the robot, position further grippers or a gripper 38 containing or gripping the drained batteries on the robot into alignment with recharging means in one or more of the recharging cells 36 of the library 10, while gripper or grippers 34 engages and withdraws a fully-charged battery from a battery cell of the library 10 into the robot 26, such as into a lower compartment therein, thereby ensuring a continuous supply of electrical power to the robot without any kind of interruption in the functioning thereof or of the library. Hereby, the continuous supply of power to the robot 26 may be ensured during the interval when the grippers 34, 38 change the batteries, by equipping the robot with an energy accumulator or back-up battery which is operative during the battery-changing time intervals.

The lower end of the robot 26 which is below such battery grippers 34, 38 may incorporate suitable structure, such a wheeled arrangement for moving the robot in an x direction, and/or y direction along the length of the library, and accordingly hold various types of information or control operating cards, as required.

Furthermore, as previously indicated, the robot 26 being rotated about its vertical axis, such as through an angle of 360°, may have the batteries mounted or supported thereon in alignment with fully charged or charging batteries in the opposite row or array of cells, and whereby the process of replacing such batteries which are drained may be repeated as previously described in relation to the other or opposite side or array of cells on the walls of the library structure. From the foregoing, it becomes readily apparent that the novel battery charging and changing arrangement eliminates any need for any cable for power transfer or supply to the robot 26, and information to the robot can be wirelessly transmitted, such as through optical methods; in effect, a laser or the like, and that the robot is not tethered, thereby eliminating restrictions on the length and spatial areas of the automated data-storage library and in the providing of additions thereto along its extend.

As illustrated, although the locations of the battery charging cells are shown to be along the side walls 16, 18 of the library 10, they can also be at the ends of the library. Additionally, any energy from the downward motion of the media grippers can be stored in capacitors to provide additional power or energy boosts to the robot 26 besides that of the rechargeable batteries; for instance, during the battery-changing periods for the robot or other functions thereof.

From the foregoing it is clearly apparent that the power supply to the robot enabling the exchange of energy batteries, particularly in an automated data-storage library, is clearly simple to install and inexpensive to operate, while facilitating continuous operation of the automated data-storage library.

While the invention has been particularly shown and described with respect to preferred embodiments thereof, it will be understood by those skilled in the art that the foregoing and other changes in form and details may be made therein without departing from the spirit and scope of the invention.

What is claimed is:

1. An apparatus for exchanging rechargeable batteries in a media conveying robot located in an automated data-storage library; comprising:
   at least one battery-charging cell in said library for selectively storing charged batteries and for charging drained batteries;
   said robot containing at least one battery for supplying operating power to said robot;
   and first gripper structure on said robot for replacing said at least one battery in said robot upon being drained, and second gripper structure on said robot for retrieving a charged battery from said at least one battery charging cell in said library and conveying said charged battery to said robot.

2. An apparatus as claimed in claim 1, wherein said library includes a plurality of said battery charging cells, said robot including at least two said battery gripper structures for simultaneous battery replacement operation.

3. An apparatus as claimed in claim 2, wherein said plurality of battery charging cells are arranged in mutually spaced relationship along the extent of said library to enable access thereto by said battery gripper structures at predetermined positions of said robot relative to said library.

4. An apparatus as claimed in claim 3, wherein said battery-charging cells are spaced along the lower ends of spaced walls of said library, said robot being moveable between said walls and having said battery gripper structures mounted proximate to the lower end of said robot.

5. An apparatus as claimed in claim 2, wherein said robot is rotatable about a vertical axis to facilitate access by said battery gripper structures to said battery-charging cells at different angular and rotational orientations of said robot.

6. An apparatus as claimed in claim 1, wherein said first one of said battery gripper structure ejects a drained battery from said robot while said second one of said battery gripper structures simultaneously withdraws a charged battery from a battery-charging cell in said library.

7. An apparatus as claimed in claim 6, wherein said first one battery gripper structure conveys said drained battery into an empty said battery-charging cell for recharging said drained battery, said second battery gripper structure simultaneously positioning said charged battery in said robot to facilitate an uninterrupted supply of power to said robot for continuous operation thereof.

8. An apparatus as claimed in claim 1, wherein said at least one battery comprises a sole battery energy source for said robot.

9. An apparatus as claimed in claim 1, wherein said library comprises battery-charging stations in front of drives for charging drained batteries during periods of idling of said library.

10. A method of exchanging rechargeable batteries in a media conveying robot located in an automated data-storage libraiy, said method comprising:
    providing at least one battery-charging cell in said library for selectively storing charged batteries and for charging drained batteries;
    equipping said robot with at least one battery for supplying operating power to said robot;
    and providing first gripper structure on said robot for replacing said at least one battery in said robot upon being drained, and second gripper structure on said robot for retrieving a charged battery from said at least one battery charging cell in said library and conveying said charged batter to said robot.

11. A method claimed in claim 10, wherein said library includes a plurality of said battery-charging cells, said robot including at least two said battery gripper structures for simultaneous battery replacement operation.

12. A method as claimed in claim 11, wherein said plurality of battery charging cells are arranged in mutually spaced relationship along the extent of said library to enable access thereto by said battery gripper structures at predetermined positions of said robot relative to said library.

13. A method as claimed in claim 12, wherein said battery charging cells are spaced along the lower ends of spaced walls of said library, said robot being moveable between said walls and having said battery gripper structures mounted proximate to the lower end of said robot.

14. A method as claimed in claim 11, wherein said robot is rotatable about a vertical axis to facilitate access by said battery gripper structures to said battery charging cells at different angular and rotational orientations of said robot.

15. A method as claimed in claim 10, wherein a first one of said battery gripper structures ejects a drained battery from said robot while said second one of said battery gripper structures simultaneously withdraws a charged battery from a battery charging cell in said library.

16. A method as claimed in claim 15, wherein said first one battery gripper structure conveys said drained battery into an empty said battery charging cell for recharging said drained battery, said second battery gripper structure simultaneously positioning said charged battery in said robot to facilitate an uninterrupted supply of power to said robot for continuous operation thereof.

17. A method as claimed in claim 10, wherein said at least one battery comprises a sole battery energy source for said robot.

18. A method as claimed in claim 10, wherein battery-charging stations in front of drives of said library charge drained batteries during periods of idling of said library.

19. An automated data-storage library incorporating an apparatus for exchanging rechargeable batteries in a media conveying robot located in said automated data-storage library; comprising:

at least one battery-charging cell in said library for selectively storing charged batteries and for charging drained batteries;

said robot containing at least one battery for supplying operating power to said robot;

and first gripper structure on said robot for replacing said at least one battery in said robot upon being drained, and a second gripper structure for retrieving a charged battery from said at least one battery charging cell in said library and conveying said charged battery to said robot.

* * * * *